US006170265B1

(12) United States Patent
Polifke et al.

(10) Patent No.: US 6,170,265 B1
(45) Date of Patent: Jan. 9, 2001

(54) METHOD AND DEVICE FOR MINIMIZING THERMOACOUSTIC VIBRATIONS IN GAS-TURBINE COMBUSTION CHAMBERS

(75) Inventors: Wolfgang Polifke, Windisch; Christian Oliver Paschereit, Baden; Klaus Döbbeling, Windisch, all of (CH)

(73) Assignee: ABB Search Ltd., Zurich (CH)

(*) Notice: Under 35 U.S.C. 154(b), the term of this patent shall be extended for 0 days.

(21) Appl. No.: 09/111,869

(22) Filed: Jul. 8, 1998

(30) Foreign Application Priority Data

Jul. 15, 1997 (EP) ........ 97810491

(51) Int. Cl.[7] ........ F02C 7/24
(52) U.S. Cl. ........ 60/725; 431/114
(58) Field of Search ........ 60/725, 737, 752; 431/114; 181/255

(56) References Cited

U.S. PATENT DOCUMENTS

| | | | | |
|---|---|---|---|---|
| 3,951,566 | | 4/1976 | Mattei et al. . | |
| 4,122,674 | * | 10/1978 | Anderson et al. | 60/725 |
| 4,199,295 | | 4/1980 | Raffy et al. . | |
| 4,409,787 | * | 10/1983 | David et al. | 60/725 X |
| 4,760,695 | * | 8/1988 | Brown et al. | 60/725 X |
| 5,092,425 | | 3/1992 | Shaw, Jr. . | |
| 5,428,951 | * | 7/1995 | Wilson et al. | 60/725 X |

FOREIGN PATENT DOCUMENTS

0576717A1 1/1994 (EP) .

* cited by examiner

*Primary Examiner*—Timothy S. Thorpe
*Assistant Examiner*—David J. Torrente
(74) *Attorney, Agent, or Firm*—Burns, Doane, Swecker & Mathis, L.L.P.

(57) ABSTRACT

In a gas turbine having a device for the fuel injection, which injects fuel into a mixing device (12), the injected fuel being mixed with combustion air in the mixing device (12), and in which the gas turbine also has a combustion chamber (16) arranged downstream of the mixing device (12), the length of the combustion chamber being $L_{BK}$ and the length of the mixing device being $L_{Mix}$, in order to suppress thermoacoustic vibrations the premix combustion chamber (10) containing the combustion chamber (16) and the mixing device (12) is designed in such a way that an acoustic pressure fluctuation which occurs in the premix combustion chamber (10) at the combustion-chamber outlet (20) is superimposed in phase opposition on an entropy-wave-induced pressure fluctuation at a certain frequency to be damped.

6 Claims, 2 Drawing Sheets

METHOD AND DEVICE FOR MINIMIZING THERMOACOUSTIC VIBRATIONS IN GAS-TURBINE COMBUSTION CHAMBERS

BACKGROUND OF THE INVENTION

1. Field of the Invention

The invention relates to a gas turbine, comprising a device for the fuel injection, which injects fuel into a mixing device, the injected fuel being mixed with combustion air in the mixing device. The gas turbine also has a combustion chamber arranged downstream of the mixing device, the length of the combustion chamber being $L_{BK}$ and the length of the mixing device being $L_{Mix}$.

2. Discussion of Background

Undesirable thermoacoustic vibrations often occur in combustion chambers of gas turbines. In this case, thermoacoustic vibrations denote thermal and acoustic disturbances which amplify one another. In the process, high vibration amplitudes may occur and these may lead to undesirable effects, such as, for instance, high mechanical loading of the combustion chamber, increased emissions due to inhomogeneous combustion, and even extinction of the flame.

The cooling air which flows into the combustion chamber has an important function in the case of conventional combustion chambers, since the cooling-air film on the combustion-chamber wall has a sound-damping effect. In modern gas turbines, however, virtually the entire portion of the air is directed through the burner itself in order to achieve the lowest possible $NO_x$ emissions, and therefore the portion for the film cooling of the combustion chamber is reduced. As a result, the cooling air largely does not function as a damper of acoustic and thermoacoustic vibrations.

A further possibility of sound damping consists in coupling Helmholtz dampers in the region of the cooling-air feed, as described, for instance, in EP-A10576717. However, this is not always possible for reasons of space. In addition, this method often requires considerable expenditure in terms of design.

SUMMARY OF THE INVENTION

Accordingly, one object of the invention is to provide a novel method which is as simple as possible and involves the lowest possible expenditure in terms of design and the least possible additional space requirement and with which undesirable thermoacoustic vibrations in gas-turbine combustion chambers can be minimized.

This object is achieved according to the invention by suitable tuning of mixing device, burner and/or combustion chamber in such a way that entropy waves produced by fluctuations of the gas velocity at the location of the fuel injection induce pressure fluctuations at the combustion-chamber outlet which are superimposed in phase opposition on the pressure fluctuations prevailing in the combustion chamber and thus bring about an overall reduction in the fluctuation amplitudes. According to the invention, this is achieved by a suitable selection of a series of parameters of the combustion chamber, the mixing device and the combustion variables themselves.

Experience shows that fluctuations in the flow velocity at the location of the fuel injection lead to fluctuations in the fuel concentration at the location of the heat release and thus to temperature fluctuations in the hot gas. These temperature fluctuations, more generally designated as entropy fluctuations, are transferred convectively to the combustion-chamber outlet. Due to the narrowing cross section at the combustion-chamber outlet or in the first turbine row, these entropy fluctuations induce pressure fluctuations at a critical cross section, at which the gas velocity virtually reaches or fully reaches the sound velocity. The phase of these pressure fluctuations relative to the phase of the acoustic pressure fluctuations of the combustion chamber is determined by a series of parameters of the combustion chamber, such as, for instance, the length of the combustion chamber, the length of the mixing device and the temperatures of hot gas and fresh gas (and thus the sound velocities in the hot and fresh gas).

According to the invention, these parameters are now selected in such a way that the entropy-wave-induced pressure fluctuations are in phase opposition to certain acoustic pressure fluctuations at the combustion-chamber outlet. In this case, in phase opposition means that there is a phase difference of $\pi$, $3\pi$, $5\pi$, etc., that is, an odd-numbered multiple of $\pi$, between the two phases at this point. The entropy-wave-induced pressure fluctuations cannot in general be selected in phase opposition to the acoustic pressure fluctuations at all frequencies. According to the invention, the entropy-wave-induced pressure fluctuations are then selected in phase opposition to the acoustic pressure fluctuations at such a frequency $\omega$ at which the combustion chamber tends to produce considerable pressure fluctuations on account of its geometry and its mechanical properties. In this case, the most frequently occurring forms of acoustic pressure fluctuations are the acoustic natural modes.

This tuning in phase opposition is preferably achieved by a corresponding selection of the length of the combustion chamber and/or the length of the mixing section. Setting via the mass flow in the mixing device, for instance by a change in the inlet-vane row setting of the compressor, may also be advantageous. Furthermore, the mass flow in the combustion chamber or the hot-gas temperature may also be suitably selected in an advantageous manner.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Only the elements essential for the understanding of the invention are shown. Not shown are, for example, the exhaust-gas casing of the gas turbine with exhaust-gas tube and flue, the compressor, and collecting space of the turbine.

DESCRIPTION OF THE PREFERRED EMBODIMENTS

Figure 1:
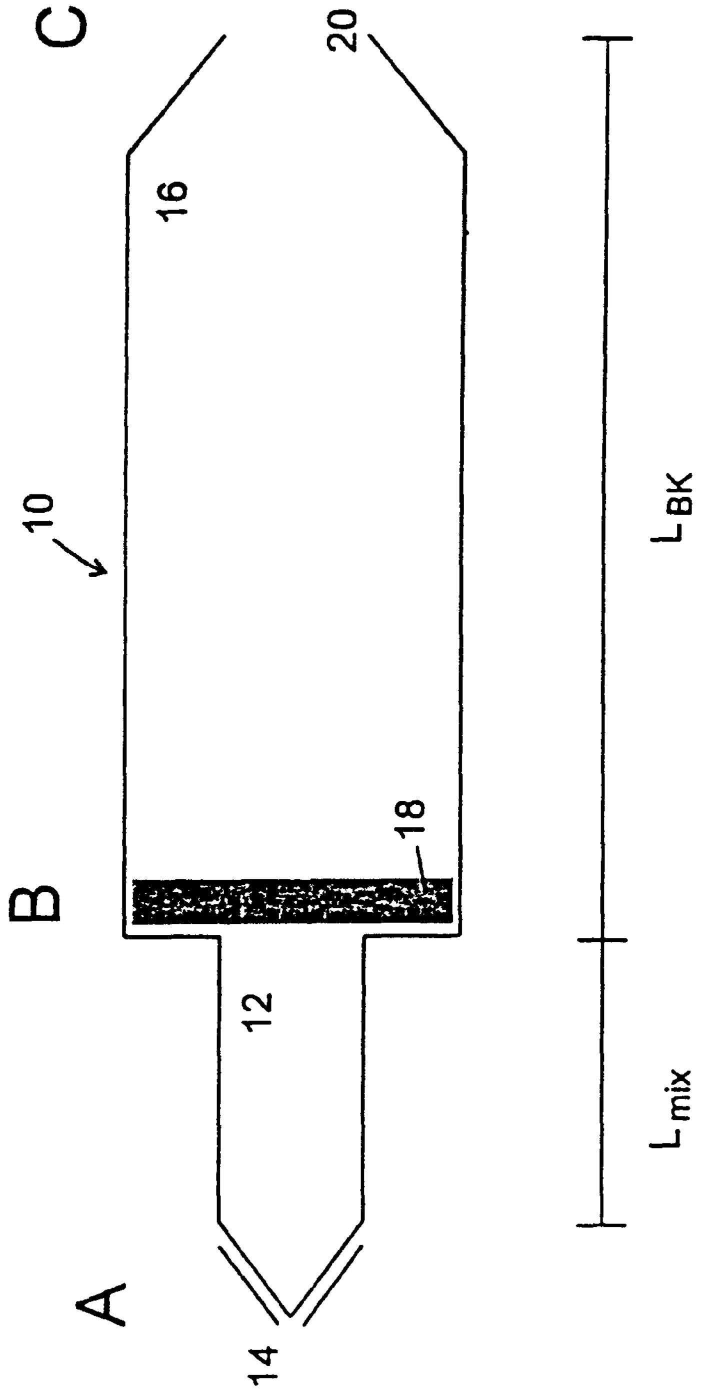
FIG. 1 shows a diagrammatic sketch of a premix combustion chamber in partial longitudinal section.

Referring now to the drawings, wherein like reference numerals designate identical or corresponding parts throughout the several views, FIG. 1 shows a diagrammatic sketch of a combustion chamber for premixed combustion 10. The fuel is injected through the opening 14 (location A) and thus admixed with the combustion air. The mixing device 12 serves to mix the combustion air and the fuel as homogeneously as possible. Let the length of the mixing device 12 be $L_{mix}$. (In certain embodiments, the mixing device is designed as a mixing tube.) The combustion, as indicated by the flame 18 in FIG. 1, takes place at the end of the mixing device 12 or at the inlet to the combustion chamber 16 (location B). Let the length of the combustion chamber 16 be $L_{BK}$. At the combustion-chamber outlet 20 (location C), the burned air then flows into the turbine (not shown). The fuel/air mixture in the mixing device 12, that is, on the cold side of the flame 18, is designated below as fresh gas; the burned fuel/air mixture on the hot side of the flame 18 is designated as hot gas.

It has now been found that thermoacoustic vibrations are generally caused by fluctuations $\Delta Q$ at location B, that is, the location of heat release. In this case, the entire fluctuation may be represented as the sum of a hydrodynamic portion $\Delta Q_\Omega$ and a mixing-controlled portion $\Delta Q_\lambda$.

In this case, the hydrodynamic portion may be attributed to fluctuations of the turbulent mixing rate of fresh and hot gas. This portion does not lead to temperature fluctuations in the hot gas, since, although the instantaneously converted quantity of fresh gas and thus the instantaneously produced heat quantity fluctuate, the fuel concentration in the fresh gas and thus the released heat per mass do not fluctuate.

It has been found that the second, mixing-controlled portion $\Delta Q_\lambda$ during the undesirable combustion-chamber vibrations is important. This portion may be attributed to fluctuations in the velocity at the location of the fuel injection. A fluctuation in the velocity $\Delta u_I$ at the location of the fuel injection (location A) leads, after a certain delay time $\tau_{mix}$, to a fluctuation in the heat-release rate $\Delta Q_\lambda$ at location B, since the air quantity and thus the fuel concentration at location B vary due to such fluctuations. In this case, the delay time $\tau_{mix}$ is essentially the retention time of the fuel/air mixture in the mixing device 12 and is therefore determined by the length $L_{mix}$ of the mixing device and the flow velocity $u_c$ of the fresh gas. Thus, as a first approximation, the following applies:

$$\Delta Q_\lambda(t)/Q = -\Delta u_I(t-\tau_{mix})/u_I \quad (1)$$

where Q represents the average heat quantity released at location B and $u_I$ represents the average velocity at the location of the fuel injection (A). As described above, the fluctuation of the heat release at time t, on account of the transit time of the fresh gas in the mixing device, depends on the velocity fluctuation at an earlier instant $(t-\tau_{mix})$. If a velocity fluctuation which varies periodically with a frequency $\omega$ is now assumed, the heat-release rate also varies periodically with this frequency, and for the phase difference of the two fluctuations the following applies:

$$\Phi_\lambda = \pi - \omega\tau_{mix} \quad (2)$$

In this case, the additional phase rotation of $\pi$ may be attributed to the fact that the heat-release rate at location B is proportional to the fuel/air ratio and thus inversely proportional to the velocity fluctuation at location A.

Since a higher fuel concentration leads to a higher temperature of the hot gas, temperature fluctuations (or more generally entropy fluctuations) develop at location B and these are transferred with the velocity $u_H$ of the hot gas to the combustion-chamber outlet (location C). Periodic fluctuations of the velocity at the location of the fuel injection (location A) therefore lead to entropy waves, which spread from the location of the combustion (location B) to the combustion-chamber outlet (location C).

Due to the narrowing cross section at the combustion-chamber outlet, these entropy fluctuations at location C in turn induce pressure fluctuations. In this case, the phase position of these pressure disturbances at location C relative to the phase of the heat-release rate is given by the convective flow velocity of the hot gas, i.e. by the dwell time $T_{BK}$ of the hot gas in the combustion chamber. This relative phase $\Phi_s$ is then given by:

$$\Phi_s = -\omega T_{BK} \quad (3)$$

On the whole, therefore, the phase difference between the periodic pressure fluctuation at the combustion-chamber outlet (location C) and the velocity fluctuations at location A results in $\Phi_{entropy} = \Phi_\lambda + \Phi_s$.

Irrespective of these temperature fluctuations, experience shows that, in combustion chambers, there are acoustic fluctuations and vibrations which are more or less pronounced, depending on the respective design of a combustion chamber. In general, acoustic vibrations are especially pronounced in particular close to the natural vibrations of the combustion chamber or a system of combustion chamber plus combustion-chamber dome. The boundary conditions of the acoustic vibrations result, on the one hand, from the fact that the combustion-chamber outlet 20 has a high acoustic impedance, that is, it represents an acoustically hard end. On the upstream side, the boundary of the collecting space (not shown in FIG. 1) or a combustion-chamber dome generally forms an acoustically hard end. For a stationary acoustic wave in the oscillating system defined by the two acoustically hard ends, the phase difference between the pressure fluctuation at the combustion-chamber outlet (location C) and the velocity fluctuations at location A is then given by:

$$\Phi_{acoustic} = \pi/2 - \omega L_{mix}/c_c - \omega L_{BK}/c_H \quad (4)$$

In this case, the phase shift of $\pi/2$ represents the normal phase displacement between pressure and velocity fluctuations in a stationary acoustic wave. The two other terms on the right-hand side of equation (4) result from the transit time of a sound wave in the combustion chamber (sound velocity $c_H$ in the hot gas) and in the mixing device (sound velocity $c_c$ in the fresh gas).

It has now been found that the relative phase of the stationary acoustic wave and the entropy wave at the location of the combustion-chamber outlet during the damping or amplification of the combustion-chamber vibrations, which are always present, is very important. The phase difference between the acoustic wave and the entropy wave is:

$$\Phi_{rel} = \Phi_{entropy} - \Phi_{acoustic} = \pi/2 - \omega(\tau_{mix} + T_{BK} - L_{mix}/c_c - L_{BK}/c_H) \quad (5)$$

If it is now known that the combustion chamber tends to produce considerable pressure fluctuations at a certain frequency $\omega$ on account of its geometry and its mechanical properties, the parameters available are selected according to the invention in such a way that the relative phase $\Phi_{rel}$ at this frequency is an odd-numbered multiple of $\pi$. The entropy-wave-induced pressure disturbances and the pressure fluctuation of the stationary acoustic wave at the combustion-chamber outlet 20 are then superimposed in phase opposition, so that the entire thermoacoustic disturbance at this frequency is minimized. If, on the other hand, the relative phase $\Phi_{rel}$ at a frequency ω is an even-numbered multiple of π, the entropy-wave-induced pressure disturbances and the pressure fluctuation of the stationary acoustic wave are amplified, which results in markedly higher vibration amplitudes and thus increased mechanical loading of the combustion chamber and the further disadvantages associated therewith.

According to the invention, it is especially advantageous if the combustion chamber and premix section are designed for tuning in phase opposition through the selection of the length $L_{BK}$ of the combustion chamber and/or the length $L_{mix}$ of the mixing device. Here, the sizes $L_{BK}$ and/or $L_{mix}$ are selected in such a way that the relative phase $\Phi_{rel}$, as defined in equation (5), is an odd-numbered multiple of π at the frequency to be damped. The frequency to be damped, as described above, will generally be a frequency at which the combustion chamber tends to produce considerable pressure fluctuations on account of its geometry and mechanical properties.

It should be noted here that the invention can be implemented even if the mixing section is very short or is even omitted entirely or if the mixing device is integrated in the fuel injection or the swirl generator (as, for example, in the case of the ABB double burner). It is important in this case that the correspondingly shorter delay time $\tau_{mix}$ between fuel injection and the location of the heat release is taken into account in the design.

It may likewise be advantageous according to the invention to obtain or improve the tuning in phase opposition—possibly in addition to the selection of the lengths $L_{BK}$ and/or $L_{mix}$—by the gas velocities, that is, the velocity of the fresh gas in the mixing device and/or the velocity of the hot gas in the combustion chamber.

The control or improvement of the tuning in phase opposition through the selection of the temperature of fresh and/or hot gas may also be advantageous, possibly in addition to the possibilities already discussed above. These temperatures do not enter equation (5) directly; however, they influence the sound velocities $c_c$ and $c_H$ and the dwell times of the gases in the mixing device and combustion chamber.

Figure 2:
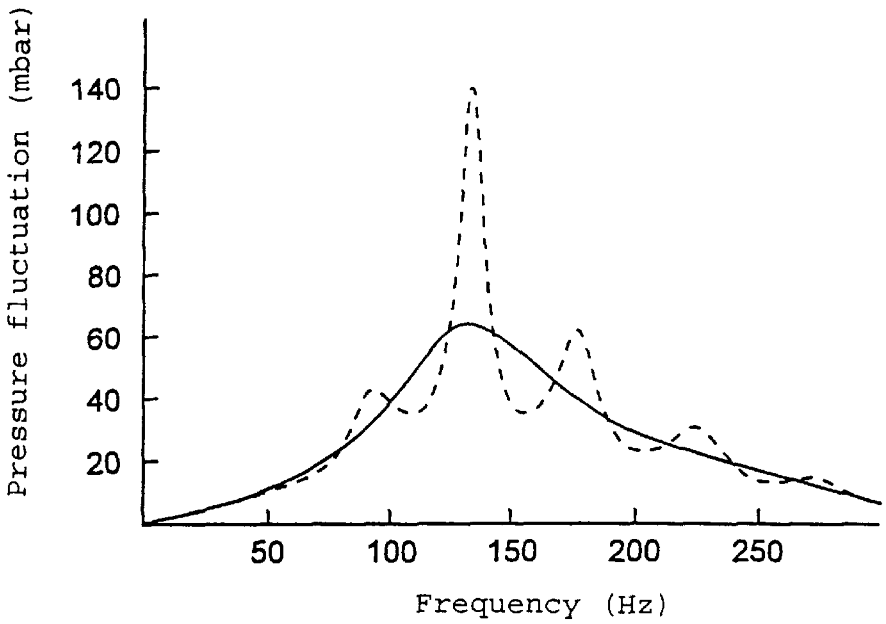
FIG. 2 shows, for an exemplary embodiment of a combustion chamber, the absolute magnitude of the pressure fluctuations in mbar plotted against the frequency in the case of an in-phase superimposition of acoustic and entropy-induced pressure fluctuations at the location of the combustion-chamber outlet.
Figure 3:
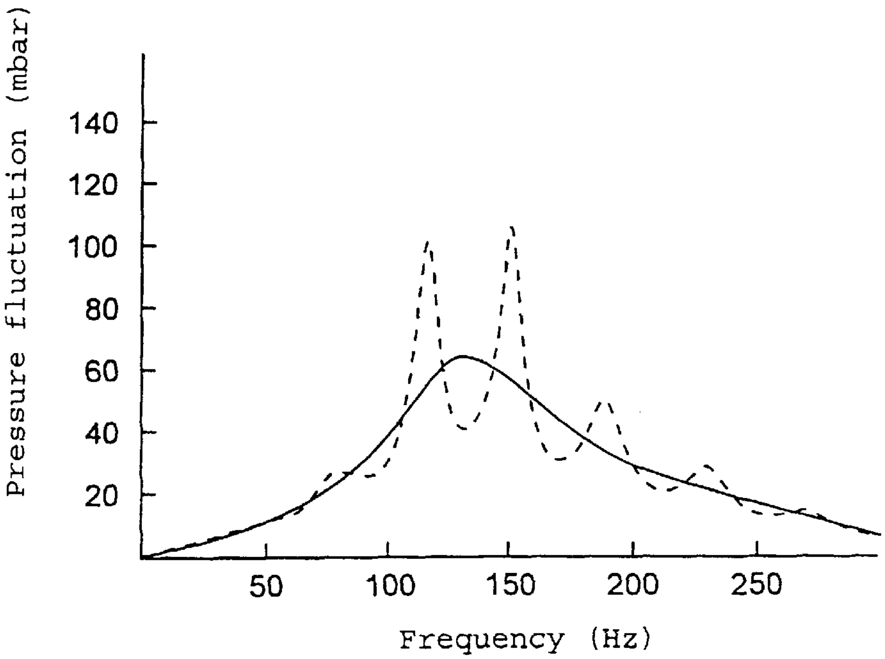
FIG. 3 shows, for an exemplary embodiment of a combustion chamber, the absolute magnitude of the pressure fluctuations in mbar plotted against the frequency in the case of a superimposition in phase opposition of acoustic and entropy-induced pressure fluctuations at the location of the combustion-chamber outlet.

The advantages of the invention are shown in a specific example in FIGS. 2 and 3. The example relates to a typical premix combustion chamber having a combustion-chamber length $L_{BK}$=0.65 m, a length of the mixing device of $L_{mix}$=0.1 m, a delay time $\tau_{mix}$ of 1.25 ms, a dwell time in the combustion chamber of $T_{BK}\approx$20 ms, and sound velocities in the fresh gas and hot gas of $c_c$=547 m/s and respectively $c_H$=796 m/s. The combustion chamber tends to produce considerable pressure fluctuations at a resonant frequency of about 128 Hz. This can be seen from the solid lines in FIGS. 2 and 3, which have been calculated with a numerical model for combustion-chamber thermoacoustics. FIG. 2 shows the pressure fluctuations in the case of an in-phase superimposition of acoustic and entropy-wave-induced pressure fluctuations at 128 Hz; FIG. 3 shows the pressure fluctuations in the case of a superimposition in phase opposition according to the invention. The amplitude of the pressure fluctuations at around 128 Hz can be reduced considerably by the design in phase opposition. Although secondary peaks may occur, the overall loading of the combustion chamber by thermoacoustic vibrations is markedly reduced.

Obviously, numerous modifications and variations of the present invention are possible in light of the above teachings. It is therefore to be understood that, within the scope of the appended claims, the invention may be practiced otherwise than as specifically described herein.

| LIST OF DESIGNATIONS | |
|---|---|
| 10 | Premix combustion chamber |
| 12 | Mixing device |
| 14 | Opening |
| 16 | Combustion chamber |
| 18 | Flame |
| 20 | Combustion-chamber outlet |

What is claimed as new and desired to be secured by Letters Patent of the United States is:

1. A premix combustion chamber in a gas turbine having a natural vibration frequency ω, comprising:

a combustion chamber having an inlet at which combustion takes place, and an outlet to a turbine;

a mixing device arranged upstream of the combustion chamber and connected to the combustion chamber inlet;

a fuel injection device for injecting fuel at a fuel injection location into the mixing device with a fuel injection speed;

the combustion generating entropy fluctuations in response to variations of the fuel injection speed;

in which premix combustion chamber an acoustic oscillation of frequency ω originating at the fuel injection location has a first phase at the combustion chamber outlet, said first phase depending on the length of the mixing device and on the length of the combustion chamber; and in which premix combustion chamber an entropy-fluctuation-induced pressure wave of frequency to has a second phase at the combustion chamber outlet, said second phase depending on the length of the mixing device and on the length of the combustion chamber;

wherein at least one of the length of the mixing device and the length of the combustion chamber is selected such that the second phase is in phase opposition to the first phase.

2. The gas turbine as claimed in claim 1, wherein, in the design of the premix combustion chamber, the sound velocities in the combustion chamber and in the mixing device are taken into account, so that the acoustic pressure fluctuation at the combustion-chamber outlet is superimposed in phase opposition on the entropy-wave-induced pressure fluctuation.

3. The gas turbine as claimed in claim 1, wherein, in the design of the premix combustion chamber, the gas velocities in the combustion chamber and in the mixing device are taken into account, so that the acoustic pressure fluctuation at the combustion-chamber outlet is superimposed in phase opposition on the entropy-wave-induced pressure fluctuation.

4. A method of minimizing the pressure amplitude of thermoacoustic vibrations in a gas turbine having a premix chamber containing a combustion chamber, a mixing device, and a fuel injection device for injecting fuel at a fuel injection location into the mixing device with a fuel injection speed; comprising the steps of:

generating in the premix combustion chamber an acoustic oscillation of frequency ω originating at the fuel injection location, the frequency ω having a first phase at an outlet of the combustion chamber, the first phase depending on the length of the mixing device and on the length of the combustion chamber;

generating in the premix combustion chamber an entropy-fluctuation-induced pressure wave of frequency ω, the frequency ω having a second phase at the combustion chamber outlet, the second phase depending on the length of the mixing device and on the length of the combustion chamber;

selecting at least one of the length of the mixing device and the length of the combustion chamber such that the second phase is in phase opposition to the first phase.

5. The method as claimed in claim 4, wherein the sound velocities in the combustion chamber and/or in the mixing device are selected in such a way that the acoustic natural mode is superimposed in phase opposition with the propagating entropy wave at the combustion-chamber outlet.

6. The method as claimed in claim 4, wherein the gas velocities in the combustion chamber and/or in the mixing device are selected in such a way that the acoustic natural mode is superimposed in phase opposition with the propagating entropy wave at the combustion-chamber outlet.

* * * * *